United States Patent [19]

Lang et al.

[11] Patent Number: 4,999,084
[45] Date of Patent: Mar. 12, 1991

[54] METHOD FOR HEAT TREATING SHORT FIBER FRACTIONS AFTER SEPARATION OF THE LONG FIBER FRACTIONS FROM A SECONDARY FIBER MIXTURE

[75] Inventors: Heinrich Lang, Fronreute-Fronhofen; Harald Selder, Schlier, both of Fed. Rep. of Germany

[73] Assignee: Sulzer-Escher Wyss GmbH, Ravensburg, Fed. Rep. of Germany

[21] Appl. No.: 389,806

[22] Filed: Aug. 4, 1989

[30] Foreign Application Priority Data

Aug. 12, 1988 [DE] Fed. Rep. of Germany ....... 3827336

[51] Int. Cl.⁵ .......................... D21B 1/32; D21C 5/02
[52] U.S. Cl. ........................................... 162/4; 162/9; 162/55; 162/60; 162/68; 162/147; 162/149
[58] Field of Search ................... 162/55, 60, 68, 4, 9, 162/13, 129, 130, 147, 149

[56] References Cited

U.S. PATENT DOCUMENTS

| | | | |
|---|---|---|---|
| 2,317,384 | 4/1943 | Mason et al. | 162/68 |
| 4,312,701 | 1/1982 | Campbell | 162/68 |
| 4,332,638 | 6/1982 | Mauer et al. | 162/55 |
| 4,334,984 | 6/1982 | Vagac et al. | 162/4 |
| 4,405,450 | 9/1983 | Selder | 162/4 |
| 4,704,201 | 11/1987 | Keck et al. | 162/4 |

FOREIGN PATENT DOCUMENTS

| | | |
|---|---|---|
| 1114214 | 12/1981 | Canada ................. 162/68 |
| 1761864 | 9/1971 | Fed. Rep. of Germany . |
| 2908660 | 9/1980 | Fed. Rep. of Germany . |
| 2494735 | 5/1982 | France . |

Primary Examiner—David L. Lacey
Assistant Examiner—Todd J. Burns
Attorney, Agent, or Firm—Sandler, Greenblum & Bernstein

[57] ABSTRACT

To remove disturbing wax particles and for increasing the specific volume the short fiber fraction is subjected to a thermal treatment, especially by application of water vapor or steam, in a heater, such as a worm heater throughout a defined residence time and a defined temperature. With relatively low energy expenditure the distrubing wax particles are eliminated in such a manner that no wax spots or speckles can be discerned in the finished product. The specific volume of the short fiber fraction is appreciably increased while obtaining a predetermined strength.

14 Claims, 1 Drawing Sheet

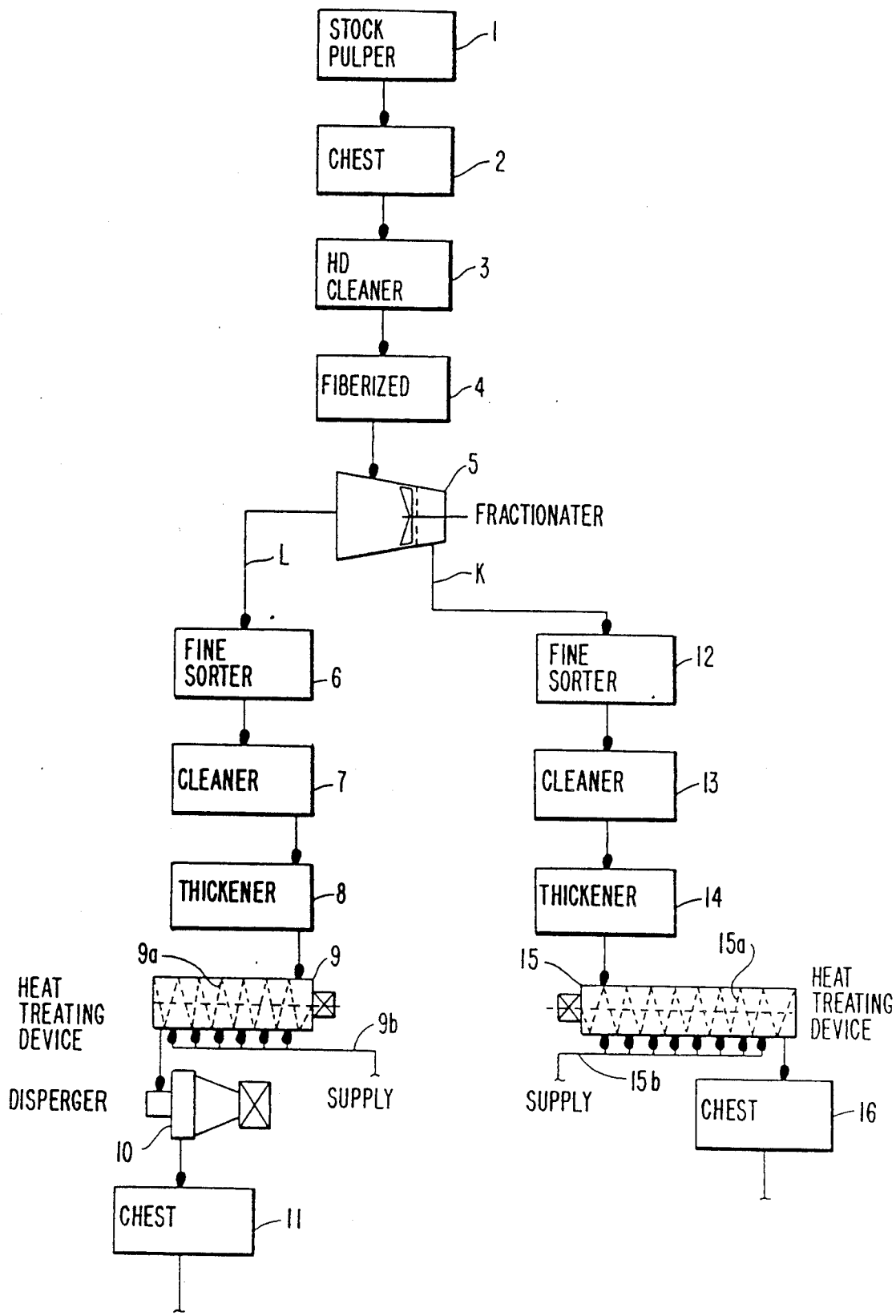

METHOD FOR HEAT TREATING SHORT FIBER FRACTIONS AFTER SEPARATION OF THE LONG FIBER FRACTIONS FROM A SECONDARY FIBER MIXTURE

BACKGROUND OF THE INVENTION

The present invention relates to a new and improved method of treating short fiber fractions after separating the long fiber fractions from a secondary fiber mixture, especially for the fabrication of cardboard folding boxes.

When fabricating cardboard folding boxes it is conventional practice to use for the most part secondary fibers. These secondary fibers constitute fibers which are obtained upon processing waste paper. This fiber mixture composed of long and short fibers is subdivided into a long fiber fraction and a short fiber fraction by a fractionating machine working with screens. The long fiber stock is used in the cover layers and the short fiber stock in the inserts or liners of the cardboard.

During the preparation of the long fiber stock for the cover layers there should be obtained an increase of the strength properties, preferably the modulus of elasticity. It is for that reason that the long fibers are thermally treated in a process stage and thereafter or also simultaneously mechanically processed in a disperger. During this mechanical dispersing process there is realized, apart from improved strength, also a dispersing of disturbing wax agglomerates so that they are no longer optically disturbing. The comminuted particles bind at the surface of the long fibers so that they adhere thereto during processing. In this way the long fiber stock is free of disturbing wax particles.

As to the short fiber stock used for the inserts of liners the processing operation is less concerned with the strength properties of the short fibers as opposed to the specific volume which should be as large as possible in the product produced therefrom. As to the expression "specific volume" such is the volume related to the weight.

The short fiber fraction which is obtained from the fractionating machine—in this case the fractionating operation is accomplished in a fiber fractionator—is delivered as obtained to the papermaking machine after undergoing several cleaning and thickening steps. This technique is not satisfactory. It has been found that in the finished product there can be discerned disturbing wax spots or speckles and that these wax spots emanate from wax particles of the waste paper and which are introduced into the product by means of the short fiber fraction. It also has been found that a sorting out of the disturbing wax particles with screen sorters is not possible.

In this case it does not appear to be advantageous to accomplish a hot dispersing operation, such as employed for the long fiber fraction, since a great deal of energy would then be required as also a rather extensive equipment expenditure. Additionally, such is in contradiction to the purpose of the treatment since there is lost the desired as large as possible volume of the short fiber stock.

SUMMARY OF THE INVENTION

Therefore, with the foregoing in mind it is a primary object of the present invention to provide a new and improved method of treating a short fiber fraction after separation of the long fiber fraction from a secondary fiber mixture, particularly for the fabrication of cardboard as used for cardboard folding boxes, in a manner which is not afflicted with the aforementioned shortcomings and drawbacks of the prior art.

Another and more specific object of the present invention is directed to a new and improved method for the treatment of the short fiber fraction in which there can be eliminated from the short fiber stock the disturbing wax particles.

A further significant object of the invention is concerned with an improved method for treating the short fiber fraction so that there can be obtained as large as possible specific volume in the product which is produced from the processed short fiber stock.

In keeping with the immediately preceding objects it is also a noteworthy object of the present invention to provide an improved method for the treatment of short fiber fractions which does not require any large expenditure in energy.

Now in order to implement these and still further objects of the invention, which will become more readily apparent as the description proceeds, the method for the treatment of a short fiber fraction after separation of the long fiber fraction from a secondary fiber mixture, among other things, is manifested by the features that the short fiber fraction which is obtained in a fractionator or fractionating device is subjected in a method step to a thermal or heat treatment, especially by application of water vapor or steam, in a heater, such as a worm heater or heating device throughout a defined residence time and at a defined temperature and then is delivered to a machine without any post-treatment which would otherwise change the fibers by the action of mechanical means or expedients.

It has been found that by virtue of this purely thermal or heat treatment without any mechanical processing of the fiber stock the disturbing wax particles are extensively eliminated. Due to this operation there is simultaneously achieved the beneficial result that the attained specific volume of the short fiber stock which is thus processed is in fact appreciably increased. Following the fractionating stage or operation the wax particle spectrum in the short fiber fraction is so small that there is in fact possible a complete wax dispersing by virtue of the thermal or heat treatment. Wax spots or speckles are no longer visible in the finished product. Depending upon requirements the thermal or heat treatment can be undertaken both under atmospheric conditions as well as under pressure conditions, i.e. above atmospheric pressure.

BRIEF DESCRIPTION OF THE DRAWING

The invention will be better understood and objects other than those set forth above will become apparent when consideration is given to the following detailed description thereof. Such description makes reference to the annexed drawing wherein the single FIGURE illustrates a block diagram of an exemplary embodiment of apparatus for the performance of the inventive method.

DETAILED DESCRIPTION OF THE PREFERRED EMBODIMENTS

Describing now the drawing, it is to be understood that in order to simplify the illustration thereof, there has been shown in the single FIGURE a block diagram of an apparatus or equipment layout for practicing the method of treating the short fiber fraction after separation of the long fiber fraction from a secondary fiber mixture, particularly for fabrication of cardboard, as used for instance for the production of cardboard folding boxes.

Turning now to the drawing, it will be understood that the waste paper is pulped or slushed in a stock pulper 1. After the pulped or slushed stock 2 has been delivered to an emptying chest or vat 2 the pulped or slushed stock is freed of heavy particles in a high density cleaner 3 and is coarsely sorted, in other words, freed of other larger size contaminants or reject particles in, for instance, a fiberizer 4 defining a screen sorter. In a fiber fractionating device 5 the secondary fiber mixture is divided into the long fiber fraction L and into the short fiber fraction K. The long fiber fraction L is subjected to a fine sorting or classifying operation in the fine sorter or sorting device 6, a cleaning operation in the cleaner 7 and a thickening operation in a thickener or thickening device 8 before there is accomplished the hot disperging operation. The hot disperging operation entails a thermal or heat treating operation in a thermal or heat treating device 9 containing, for instance a worm 9a and a steam or water vapor supply 9b and a mechanical treating operation in a disperger or disperging device 10. This long fiber stock containing the mechanically strengthened long fibers is then delivered to a chest or vat 11.

After departing from the fiber fractionator or fractionating device 5 the short fiber fraction K is delivered to a fine sorter or sorting device 12 for the elimination of the remaining coarse contaminants or rejects. Thereafter the stock is infed to a cleaner or cleaning device 13, for instance a low density cleaner, such as a hydrocyclone, where it is subjected to a cleaning or washing operation and thickened at the subsequently arranged thickener or thickening device 14. The thus treated short fiber stock then undergoes a thermal or heat treatment at a thermal or heat treating device 15 which contains a heating worm 15a and which is heated by blowing in water vapor or steam from a suitable supply as generally indicated by reference 15b. In the heating or heat treatment device 15 the stock is subjected to a heat or thermal treatment throughout a defined residence time at a defined temperature The residence time may amount to 10 to 20 minutes, preferably, 15 to 20 minutes and the temperature may be in a range of 80° C. to 130° C., preferably 80° C. to 100° C. As a result, the short fiber stock has its specific volume increased and is freed of disturbing wax particles. The markedly comminuted wax particles no longer can be seen with the naked eye. After this heat treating operation in the heating device 15 the thus treated short fiber stock is delivered to a suitable receiver, here a machine chest or vat 16 of the papermaking machine without any mechanical post-treatment which would alter the fibers. In the machine chest or vat or receiver 16 the fibers may be stirred to further loosen the fibers of the short fiber fraction without mechanically altering the fibers thereof.

The heating device 15 also may be constituted by a stack tower into which there is directly blown in steam or water vapor. Such steam or water vapor may be at a temperature in the range of, for instance, 100° C. and 130° C. and the residence time may be in the range as noted previously, preferably amounts to about 10 minutes.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A method of processing a short fiber fraction, obtained after separating a long fiber fraction from a secondary fiber mixture, comprising the steps of:
   subjecting the obtained short fiber fraction to a heat treatment throughout a defined residence time and within a defined temperature range in the absence of mechanically processing said short fiber fraction, to disperse andy wax particles which may be present nd increase the specific volume of the short fiber fraction; and
   thereafter and without any further treatment which would alter the fibers by the action of mechanical means, delivering the thus treated short fiber fraction to a machine chest.

2. The method as defined in claim 1, wherein:
   said heat treatment of the short fiber fraction is accomplished by the infeed of steam.

3. The method as defined in claim 1, wherein:
   said defined residence time is in the range of 10 to 20 minutes.

4. The method as defined in claim 1, wherein:
   said defined temperature range lies between 80° C. and 130° C.

5. The method as defined in claim 1, wherein:
   said heat treatment is accomplished at a temperature exceeding 80° C. and less than or equal to 130° C.

6. The method as define in claim 1, wherein:
   said heat treatment is accomplished in a worm heater.

7. The method as defined in claim 1, further comprising the steps of:
   feeding waste paper to a pulper and pulping the waste paper therein to obtain the secondary fiber mixture;
   cleaning a high density suspension of the secondary fiber mixture in a high density fiber stock suspension cleaner;
   thereafter freeing the secondary fiber mixture by means of a screen sorter from large contaminants;
   then fractionating the secondary fiber mixture to separate the short fiber fraction from the long fiber fraction;
   subjecting the short fiber fraction to fine sorting in a screen sorter for removing small contaminants;
   cleaning a low density suspension of the short fiber fraction by means of a low density fiber stock suspension cleaner; and
   thereafter subjecting the shot fiber fraction to at least any one of a washing or thickening operation before the step of subjecting the short fiber fraction to said heat treatment.

8. The method as defined in claim 7, wherein:
   said step of cleaning the high density suspension of the secondary fiber mixture in said high density fiber stock suspension cleaner further comprises cleaning said high density suspension of the secondary fiber mixture by means of a hydrocyclone.

9. The method as defined in claim 7, wherein:
   said step of cleaning said low density suspension of the short fiber fraction further comprises subjecting said low density suspension of the short fiber fraction to a low density fiber stock suspension cleaning operation by means of a hydrocyclone.

10. The method as defined in claim 1, further including the steps of:

stirring the short fiber fraction, following the heat treatment, at a location upstream of the machine chest in order to further loosen the short fiber fraction without mechanically altering the fibers of the short fiber fraction.

11. The method as defined in claim 1, further including the steps of:

stirring the short fibers of the short fiber fraction within the machine chest, following the heat treatment in order to further loosen the fibers of the short fiber fraction without mechanically altering the fibers thereof.

12. The method as defined in claim 1, wherein:

said step of subjecting the short fiber fraction to said heat treatment is accomplished in a worm heater and said defined residence time is in the range of 15 to 20 minutes and said defined temperature is in the range of 80° C. and 100° C.

13. The method as defined in claim 1, wherein:

said step of subjecting the short fiber fraction to said heat treatment is accomplished in a stack tower by directly blowing in steam having said defined temperature between 100° C. and 130° C. and said defined residence time is about 10 minutes.

14. A method of treating a short fiber fraction obtained after separating a long fiber fraction from a secondary fiber mixture, comprising the steps of:

subjecting the obtained short fiber fraction to a heat treatment during a defined period of time and within a defined temperature range in the absence of subjecting said short fiber fraction to a mechanical action altering the fibers of the short fiber fraction to disperse any wax particles which may be present and thereby producing a short fiber stock suspension having a predeterminate specific volume;

substantially immediately thereafter and in the absence of any mechanical treatment which would alter the fibers of the short fiber fraction, delivering the thus heat treated short fiber stock suspension to a receiver associated with a cardboard making machine; and storing said short fiber stock suspension in said receiver with stirring for further loosening the fibers substantially without mechanical fiber alteration, for use in said cardboard making machine.

* * * * *

UNITED STATES PATENT AND TRADEMARK OFFICE
CERTIFICATE OF CORRECTION

PATENT NO. : 4,999,084
DATED : March 12, 1991
INVENTOR(S) : Heinrich LANG, et al.

It is certified that error appears in the above-identified patent and that said Letters Patent is hereby corrected as shown below:

column 4, line 15 change "andy" to ---any---.
    column 4, line 16 change "nd" to ---and---.
    column 4, line 53 change "shot" to ---short---.

Signed and Sealed this

First Day of September, 1992

Attest:

DOUGLAS B. COMER

*Attesting Officer*      *Acting Commissioner of Patents and Trademarks*